United States Patent Office 2,958,572
Patented Nov. 1, 1960

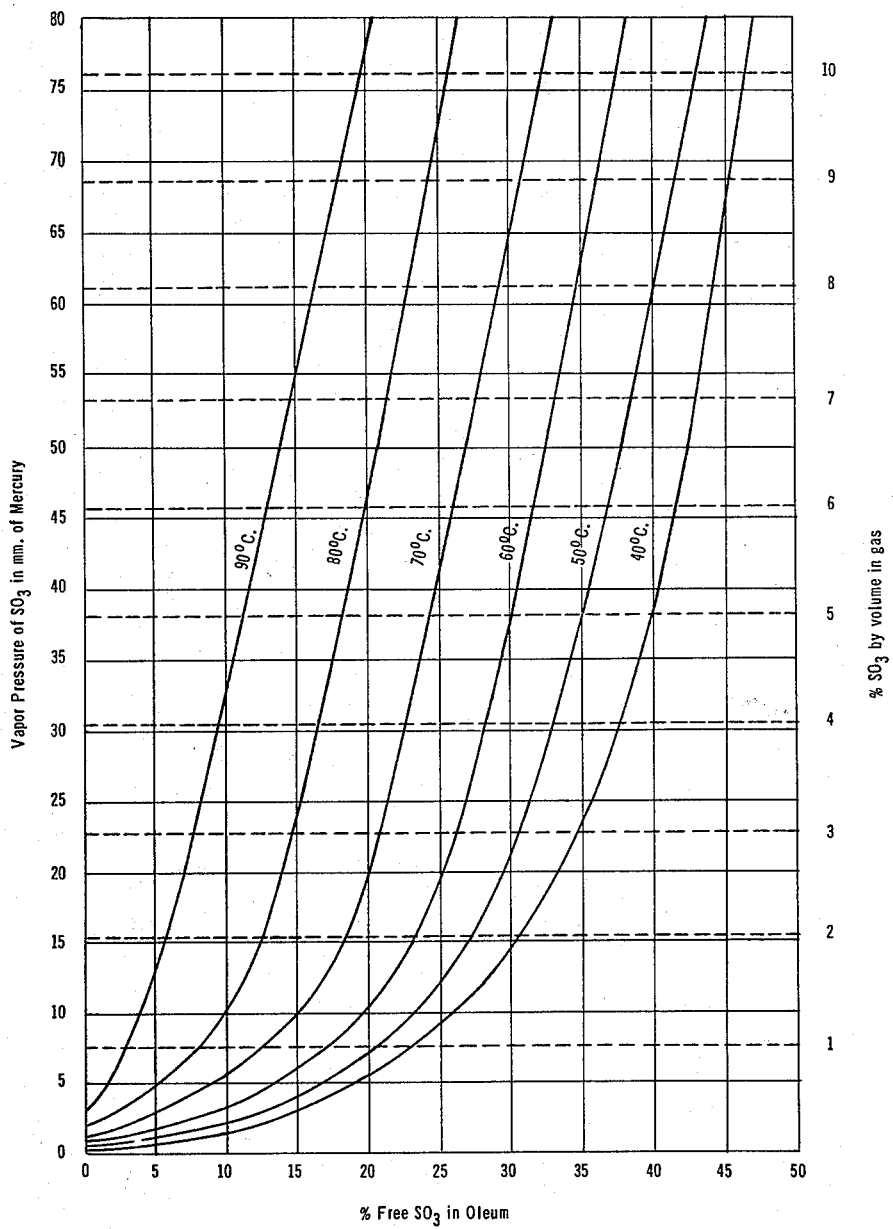

2,958,572

SEPARATION OF SELENIUM COMPOUNDS FROM SULFUR TRIOXIDE

William B. Kraich and Carlton M. Dean, Webster Groves, Mo., assignors to Monsanto Chemical Company, St. Louis, Mo., a corporation of Delaware Filed May 20, 1957, Ser. No. 660,149

4 Claims. (Cl. 23—2)

This invention relates to the separation of selenium values from gaseous mixtures of selenium values and sulfur trioxide, the term "selenium values" being used herein to mean and include elemental selenium as well as compounds of selenium.

According to the method of this invention, in its broad aspects, selenium values are separated from gaseous mixtures of selenium values and sulfur trioxide, using oleum as an agent for removing the selenium values. The term "oleum" is used herein with the same meaning as used by those skilled in the sulfuric acid art, namely, to designate sulfuric acid containing some quantity of free sulfur trioxide. In a preferred embodiment of this invention, gaseous mixtures of selenium values and sulfur trioxide are passed into intimate contact with oleum under conditions whereby the selenium values are selectively removed by the oleum while essentially no sulfur trioxide is absorbed by or stripped from said oleum.

It is an object of this invention to provide a method for the separation of selenium values from gaseous mixtures of selenium values and sulfur trioxide.

It is an object of this invention to provide a method whereby selenium values can be separated from a gaseous mixture of selenium values and sulfur trioxide to produce selenium-free sulfur trioxide and also to recover the selenium values in usable form.

Where the selenium values are present in a very minor proportion with respect to the sulfur trioxide, whereby the selenium values would be considered to be contaminants in the sulfur trioxide, it is an object of this invention to provide a method for the purification of sulfur trioxide contaminated with selenium values to produce selenium-free sulfur trioxide.

It is a further object of this invention to provide a step in a contact process for the manufacture of sulfuric acid and/or oleum whereby selenium values can be separated from converter gases contaminated with selenium values so as to facilitate the manufacture of selenium-free sulfuric acid and/or oleum.

Sulfur trioxide is generally manufactured by a "contact process," to which process this invention is particularly adapted. The term "contact process" is the name used by the art to designate a process wherein a gaseous mixture of sulfur dioxide and oxygen (usually supplied in the form of air) is passed in contact with a catalyst which promotes the oxidation of sulfur dioxide ($SO_2$) to sulfur trioxide ($SO_3$). The chamber in which $SO_2$ is catalytically oxidized to $SO_3$ is generally referred to by the art as the "converter" and, accordingly, the gaseous mixtures containing $SO_3$ which leave the converter are referred to as "converter gases." The $SO_3$ content of such converter gases is thereafter recovered by processes well known in the art, in various forms for use in commerce, such forms being, for example, sulfuric acid, oleum, and liquid sulfur trioxide. The oleums of commerce are generally graded 25, 30, 35, or 40% oleum, however higher oleums are also produced, for example, 60 or 85% oleum. A 25% oleum contains 25% by weight of dissolved or absorbed $SO_3$ and 75% by weight $H_2SO_4$; likewise, a 60% oleum contains 60% by weight of dissolved or absorbed $SO_3$ and 40% by weight $H_2SO_4$.

There are many commonly and extensively used sources for the sulfur value of the $SO_2$ which is catalytically oxidized to $SO_3$ by a contact process. Included among these sources are elemental sulfur, from which $SO_2$ is obtained by burning the elemental sulfur with air; sludge acids obtained from the treatment of petroleum fractions with concentrated sulfuric acid, from which sludge acids $SO_2$ is obtained by thermal decomposition of the sulfuric acid content; and ores containing metal sulfides from which $SO_2$ is obtained by heating such ores in the presence of air. Many sources of sulfur values are free from admixture with selenium values and, accordingly, the problem of having a mixture of $SO_3$ and selenium values is not encountered; however, there are sources of sulfur values which are in admixture with selenium values, such as volcanic sulfur. When volcanic sulfur is burned with excess air to produce $SO_2$, and the burner gases containing $SO_2$ and air are passed directly from the sulfur burner to a converter, the resulting converter gases contain gaseous selenium values (probably in the form of selenium oxides) and gaseous $SO_3$ in admixture with other gases. Where the $SO_3$ is to be further used (as such or in the form of sulfuric acid or oleum) in the manufacture of synthetic detergents, fertilizers, or other products which may be consumed or contacted by human or other animals, it is necessary that such $SO_3$ be essentially selenium-free, as selenium values are toxic to such higher forms of animal life.

Whenever one has obtained a gas stream having selenium values in admixture with sulfur trioxide, regardless of the source or cause, the selenium values and the sulfur trioxide can be effectively, efficiently, and economically separated by the practice of our invention as herein described, particularly when such selenium values are present as oxides of selenium.

We have discovered that gaseous mixtures of sulfur trioxide and selenium values can be absorbed in oleum to produce an oleum containing the selenium values, and further that $SO_3$ can thereafter be expelled or stripped therefrom while the selenium values remain in the oleum. We have also made the further discovery that selenium values (particularly selenium oxides) can be preferentially removed from gaseous mixtures containing oxides of sulfur, wherein sulfur trioxide is the principal oxide of sulfur, by passing said gaseous mixture into intimate contact with a sulfuric acid medium saturated with $SO_3$, while maintaining an essentially steady state condition with respect to the $SO_3$ concentration in the gaseous mixture and in the sulfuric acid medium; that is, one can establish an equilibrium condition wherein $SO_3$ is absorbed in the sulfuric acid medium and $SO_3$ is expelled from the said medium at essentially the same rate, while at the same time the selenium values are accumulated in said medium, but the medium employed has essentially neither a net gain nor loss of $SO_3$ content.

Where the $SO_3$ and selenium values are to be absorbed and the $SO_3$ later expelled, the initial sulfuric acid medium can be an oleum; however, where it is desired not to absorb $SO_3$ from the gaseous mixture of $SO_3$ and selenium values, the sulfuric acid medium initially should be saturated with $SO_3$ at the temperature employed. Oleum containing up to 85% free $SO_3$ can be used; however, we generally prefer to employ an oleum containing from about 15% to 35% free $SO_3$ and have determined that a 25% oleum performs exceptionally well. If some sulfur trioxide absorption can be tolerated or is desired, the temperature and the free $SO_3$ content of the sulfuric acid medium can be controlled to accomplish this end. Normally, however, such absorption is undesirable, since absorption at this point in the process reduces the quantity of selenium-free sulfur trioxide, sulfuric acid, or oleum which can be produced. The precise temperature and concentration for carrying out the preferred purification process of this invention wherein essentially no transfer of sulfur trioxide occurs, can easily be determined from published vapor pressure data or curves which show the equilibrium relation between sulfur trioxide content of the gaseous mixture and the sulfur trioxide content of the oleum at various temperatures.

An example of such vapor pressure equilibrium data is shown by the accompanying drawing, a part of which was taken from Miles' Manufacture of Sulfuric Acid and a part of which is based on data acquired by us. In general, the data and curves collected and presented by said drawing show that mixtures having an $SO_3$ content of from 1% to 10% by volume can be contacted with an oleum containing from about 3% to about 46% dissolved free $SO_3$ at varying temperatures within the range of about 40° C. to about 90° C. with essentially no gain or loss of $SO_3$ in or from gaseous mixtures containing $SO_3$ and, hence, also with a negligible gain or loss of $SO_3$ in or from the oleum used to remove the selenium values from the gaseous mixture containing $SO_3$ and selenium values. As an example of the information available from the drawing, which would enable one to practice our invention using oleum to remove selenium values from an $SO_3$ gas stream while maintaining equilibrium conditions with respect to the $SO_3$ content of the gas stream and oleum, it is assumed that it is desired to remove selenium values from a gaseous mixture containing 7% $SO_3$ by volume with 25% oleum. In order to determine the temperature at which the oleum will have to be maintained to prevent interchange of $SO_3$ between the gas and the oleum, the chart is entered at the bottom line at the point indicated by "25% free $SO_3$ in oleum"; from this point, a vertical line is followed upwardly to the intersection with the horizontal line marked "7% $SO_3$." As this point of intersection is between the curves marked 70° C. and 80° C., the temperature corresponding to this point, by interpolation, is read as 74° C., which is the desired temperature for the oleum. As a further example of how the chart may be used, it is assumed that 30% oleum at 50° C. is to be used to remove selenium values. By reading to the left of intersection of the vertical line marked "30% free $SO_3$ in oleum" and the 50° C. curve, it is seen that the vapor pressure of the $SO_3$ in the oleum is 22.5 mm. of mercury. Then, reading to the right from said intersection, it is seen that at such a vapor pressure (i.e., temperature) the corresponding concentration of $SO_3$ in the gas is 3%. This means that when using 30% oleum at 50° C. to remove selenium values, only with a gas containing 3% $SO_3$ would there be no exchange of $SO_3$ between said oleum and said gas. Obviously, therefore, if the gas contained, say 8% $SO_3$, the oleum would have to be at a higher temperature of about 68° C., or a stronger oleum, about a 40% oleum, would have to be used in order to prevent $SO_3$ exchange at the 50° C. temperature.

The invention has the particular advantages, among others, that the oleum which is used to remove selenium values is a product from the process itself, and that a very small percentage of the total selenium-free oleum production is required to be used for separation of selenium values from the gaseous mixture. The reason the quantity of oleum required for the process of this invention is small is that the selenium values are readily removed, possibly by being dissolved or absorbed, probably as selenious acid, by the oleum scrubbing medium up to and above a concentration of about 12% selenium by weight expressed as selenious acid. For example, we have found that approximately 13.5 parts by weight of selenium, expressed as selenious acid (equivalent to approximately 8.26 parts by weight, expressed as Se), will be readily dissolved in 100 parts by weight of 25% oleum (sulfuric acid containing 25% by weight dissolved free $SO_3$ and 75% $H_2SO_4$). Assuming that a sulfur source containing 500 p.p.m. of selenium (equivalent to 1.0 pound selenium per 2,000 pounds of sulfur) is used, it is calculated that 100 pounds of 25% oleum will dissolve all the selenious acid formed from the selenium appearing in 8.26 tons of such sulfur when burned with air and converted to a gas having a sulfur trioxide content of from 3% to 10% or more by volume. It has been found that the selenium in this gaseous mixture is removed and completely withheld by the stated small amount (100 pounds) of 25% oleum is maintained at 80–90° C. so that no appreciable amount of sulfur trioxide is dissolved from the gas and no appreciable amount of sulfur trioxide is stripped from said oleum.

As an example of an application of this invention, 57.9 c.f.m., measured at standard conditions of 0° C. and 760 mm. of mercury, of a gaseous mixture containing by volume about 9.3% sulfur trioxide, 0.2% sulfur dioxide, 7.9% oxygen, and 82.8% nitrogen and containing 0.0000934 pound of selenium in the form of selenium and/or selenium oxides, was passed into intimate contact with 100 pounds of 25% oleum at 80° C. Such a gas mixture will be obtained when sulfur containing 200 p.p.m. of selenium values is burned with an excess of air to produce a gas containing 9% $SO_2$ by volume, and subsequently oxidizing approximately 98% of the $SO_2$ to $SO_3$ by an oxidizing catalyst commonly used in the "contact process." The mixture was then passed into an absorption tower, wherein the sulfur trioxide in the gas stream was absorbed in sulfuric acid by methods well known in the art, to produce about 2,000 pounds of selenium-free 98% sulfuric acid. For purposes of example, if it is assumed that the concentration of selenium values in the sulfur used to produce the gas remains essentially constant at about 200 p.p.m., 100 pounds of 25% oleum used to remove selenium values would need to be replaced only about once every two months.

If desired, selenium can be easily recovered from the sulfuric acid medium saturated with $SO_3$ by diluting said medium with about equal parts by volume of water and adding thereto a surfur dioxide containing gas, an alkali metal sufate, or alkali metal bisulfite, or a combination of an alkali metal hydroxide and sulfur dioxide containing gas, causing precipitation of metallic selenium which can then be recovered by any usual method of physical separation, such as filtration or settling. As an example, an oleum scrubbing medium containing the selenium compounds, equivalent to 13.5 parts of selenious acid in 100 parts of oleum, was diluted with an equal part of water. Upon dilution, there was no precipitation of selenium compounds. Addition of sodium sulfite ($Na_2SO_3$) to the diluted mixture resulted in immediate precipitation of selenium, which was then separated from the liquid by filtration.

The selenium-free gaseous mixture containing sulfur trioxide can be employed to manufacture, by methods established in the art, liquid sulfur trioxide or various strengths of sulfuric acid and/or oleum.

When the method of this invention is used as a step in the manufacture of sulfuric acid and/or oleum by a contact process, this step would be interposed between the converter and the usual $SO_3$ absorbing system having oleum-forming and/or sulfuric acid-forming towers, as the selenium value separation method of this invention does not in any way take the place of an oleum-forming or sulfuric acid-forming tower, due to the fact that when the method of this invention is operated in an optimum manner, there is no net loss in the $SO_3$ content of the gas stream containing $SO_3$ from which the selenium values are removed. Thus, when the method of this invention is employed as a step to remove selenium values from converter gases, such step is interposed at a point where the converter gases have had no prior contact with sulfuric acid or oleum; the purification step of this invention is of particular value when interposed between the converter and the $SO_3$ absorption system where neither the $SO_2$ gases going to the converter nor the $SO_3$ containing converter gases has had prior contact with sulfuric acid or oleum. In a contemplated normal operation, the converter gases would first pass into a selenium removal tower operated in accordance with the method of this invention, from which a selenium-free $SO_3$-gas stream would be removed and passed to an oleum tower wherein the $SO_3$-gas stream would be contacted with strong sulfuric acid to form an oleum, and the gases from the oleum tower would then be passed to a strong acid tower wherein the $SO_3$-gases would be contacted with relatively weak sulfuric acid to make strong acid and completing the removal of $SO_3$ from the gas stream. These oleum towers and strong acid towers, now free of selenium, would be operated according to established and well-known methods.

While the method of this invention is particularly useful to remove selenium value contamination from converter gases containing about 3% to 11% $SO_3$, as generally produced by a converter in the normal operation of a contact process, the method of this invention can also be used for removing selenium values from gaseous mixtures containing higher or lower concentrations of sulfur trioxide; for example, the converter gases can have an $SO_3$ concentration of from about 11% to about 65%. Also, the method of this invention can be used to remove selenium values from gaseous sulfur trioxide which is essentially pure except for contamination with selenium values, or from converter gases under super-atmospheric pressure, such as 1.5 to 10 atmospheres. A high strength oleum will continue to function to remove selenium values, even though the oleum has absorbed a maximum amount of $SO_3$.

What is claimed is:

1. In a method for separating selenium values from gaseous mixtures comprised of selenium values and oxides of sulfur, wherein sulfur trioxide is the principal oxide of sulfur, the steps comprising passing said gaseous mixture into a zone wherein said gaseous mixture passes into intimate contact with sulfuric acid saturated with $SO_3$, whereby said selenium values are removed by said $SO_3$ saturated sulfuric acid, and removing a selenium-free gaseous mixture containing $SO_3$ from said zone while maintaining temperature conditions within said zone whereby the $SO_3$ concentration of said gaseous mixture entering said zone is essentially the same as the $SO_3$ concentration of the selenium-free gaseous mixture leaving said zone.

2. In the manufacture of sulfur trioxide by a contact process, the step comprising passing converter gases containing selenium values into a zone wherein said converter gases pass into intimate contact with sulfuric acid saturated with $SO_3$ and removing said selenium values by said $SO_3$ saturated sulfuric acid while maintaining the temperature conditions within said zone whereby the $SO_3$ content of said sulfuric acid remains substantially constant.

3. In the manufacture of sulfur trioxide by a contact process, the step comprising passing converter gases containing selenium values in a concentration of from about 50 p.p.m. to about 1,000 p.p.m. on a selenium basis, and sulfur trioxide in a concentration of from about 3% to about 11% by volume, into a zone wherein said converter gases pass into intimate contact with oleum containing about 25% free $SO_3$, while maintaining temperature conditions within said zone whereby the $SO_3$ concentration of said oleum remains substantially constant.

4. In a process for the production of a sulfuric acid material selected from the group consisting of sulfuric acid and oleum comprising (1) burning sulfur containing selenium values with air to produce a burner gas comprised of sulfur dioxide and selenium values, (2) passing said burner gas to a converter and therein catalytically oxidizing a major amount of the sulfur dioxide content of said burner gas to sulfur trioxide and thereby producing a converter gas comprised of sulfur trioxide and selenium values, (3) passing said converter gas to a selenium value removal zone (a) wherein said converter gas is passed into intimate contact with oleum, (b) wherein selenium values originally contained in said converter gas are absorbed by said oleum, (c) wherein a selenium-free gaseous mixture comprised of $SO_3$ is produced, and (d) from which said selenium-free gaseous mixture is removed as a selenium-free $SO_3$ gas stream, while maintaining temperature conditions within said selenium value removal zone whereby the quantity of $SO_3$ entering said zone in said converter gas is substantially equal to the quantity of $SO_3$ removed from said zone in said selenium-free gas stream, thereafter (4) passing said selenium-free $SO_3$ gas stream into an $SO_3$ absorption system wherein said selenium-free $SO_3$ gas stream is passed into intimate contact with a sulfuric acid material selected from the group consisting of sulfuric acid and oleum and a substantial portion of the $SO_3$ content of said selenium-free $SO_3$ gas stream is absorbed by said sulfuric acid material.

References Cited in the file of this patent

UNITED STATES PATENTS

| | | |
|---|---|---|
| 940,595 | Herreshoff | Nov. 16, 1909 |
| 2,520,454 | Carter | Aug. 29, 1950 |

FOREIGN PATENTS

| | | |
|---|---|---|
| 15,947 of 1898 | Great Britain | July 21, 1899 |

OTHER REFERENCES

Mellor: "A Comprehensive Treatise on Inorganic and Theoretical Chemistry," Longmans, Green and Co., New York, vol. 10, 1930, pages 90 and 188.

UNITED STATES PATENT OFFICE
CERTIFICATE OF CORRECTION

Patent No. 2,958,572                                            November 1, 1960

William B. Kraich et al.

It is hereby certified that error appears in the printed specification of the above numbered patent requiring correction and that the said Letters Patent should read as corrected below.

Column 4, line 12, after "oleum" insert -- when said oleum --.

Signed and sealed this 25th day of April 1961.

(SEAL)
Attest:

ERNEST W. SWIDER                                      DAVID L. LADD
Attesting Officer                                         Commissioner of Patents